US005301272A

United States Patent [19]

Atkins

[11] Patent Number: 5,301,272

[45] Date of Patent: Apr. 5, 1994

[54] METHOD AND APPARATUS FOR ADDRESS SPACE ALIASING TO IDENTIFY PIXEL TYPES

[75] Inventor: Mark D. Atkins, Santa Clara, Calif.

[73] Assignee: Intel Corporation, Santa Clara, Calif.

[21] Appl. No.: 981,836

[22] Filed: Nov. 25, 1992

[51] Int. Cl.[5] ........ H04N 5/92

[52] U.S. Cl. ........ 395/165

[58] Field of Search ........ 358/133; 360/9.1; 364/200, 715.03; 395/164–166, 162; 340/701, 798–800

[56] References Cited

U.S. PATENT DOCUMENTS

| | | | |
|---|---|---|---|
| 3,930,232 | 12/1975 | Wallach et al. | 364/200 |
| 4,694,357 | 9/1987 | Rahman et al. | 360/9.1 |
| 4,729,020 | 3/1988 | Schaphorst et al. | 358/133 |
| 4,985,848 | 1/1991 | Pfeiffer et al. | 395/164 |
| 5,038,309 | 8/1991 | Priem et al. | 364/715.03 |

*Primary Examiner*—Dale M. Shaw
*Assistant Examiner*—U. Chauhan
*Attorney, Agent, or Firm*—Blakely, Sokoloff, Taylor & Zafman

[57] ABSTRACT

A CPU or other graphics processor provides a pixel data stream to a graphics controller over a system bus. The pixel data stream includes a graphics controller address as well as a pixel type tag, which in the presently preferred embodiment comprises 4 bits. In addition to the graphic controller address and pixel type tag, a pixel address and pixel data are provided. The pixel type tag identifies the "type" of pixel data in the data stream supplied to the graphics controller. If the data identified by the pixel type tag corresponds to the type of data which the frame buffer is configured for, then the data provided over the system bus is simply passed through the graphics controller and written at the appropriate pixel address in the frame buffer. If, however, the pixel type tag indicates that the data is not of the same type as that for which the frame buffer is configured, then the graphic controller executes a conversion algorithm to convert the pixel data to a single pixel type acceptable to the frame buffer, and the data is then written into the frame buffer at the pixel address identified by the pixel address. Pixel type tagging is accomplished, in the preferred embodiment, in bits 27:24 of the physical address used to write pixels into the frame buffer. The CPU, or other graphics engine source, affixes the tag to the pixel data, thereby identifying its format. In the present embodiment, MDA tagging applies only to pixel write commands and not to commands reading from the frame buffer. Accordingly, the use of a pixel type tag field in the pixel data permits a graphics system to utilize a variety of standard pixel types by a CPU, graphics controller or other graphics source, while permitting the frame buffer to utilize a single pixel type to be stored in the frame buffer for subsequent display.

25 Claims, 4 Drawing Sheets

STANDARD PIXEL TYPES

| TYPE (TAG) | NAME | DESCRIPTION |
|---|---|---|
| 0000 | Ci8 | COLORINDEX 8bpp |
| 0001 | YUV8 | YUV 8bpp 2:1:1 |
| 0010 | RGB16 | RGB 16bpp (5,6,5) |
| 0011 | YUV16 | YUV 16bpp 4:2:2 |
| 0100 | RGB32 | RGBα (8,8,8,8) |
| 0101-1101 | <RESERVED> | |
| 1110 | ALPHA | STANDALONEα, 1bpp |
| 1111 | ALPHA | STANDALONEα, 8bpp |

*Figure 3*

| ADDRESS (HEX) | PIXEL TYPE |
|---|---|
| r0000000-r0FFFFFF | 0000 (Ci8) |
| r1000000-r1FFFFFF | 0001 (YUV8) |
| r2000000-r2FFFFFF | 0010 (RGB16) |
| r3000000-r3FFFFFF | 0011 (YUV16) |
| r4000000-r4FFFFFF | 0100 (RGB32) |
| rF000000-rFFFFFFF | 1111 (ALPHA8) |

r = implementation dependent 4-bit number

*Figure 4*

METHOD AND APPARATUS FOR ADDRESS SPACE ALIASING TO IDENTIFY PIXEL TYPES

BACKGROUND OF THE INVENTION

1. Field of the Invention

The present invention relates to apparatus and methods for converting and displaying pixel types in a frame buffer prior to display. More particularly, the present invention relates to an improved address space aliasing method and apparatus to identify and convert pixel types supplied by a central processing unit (CPU) to a display system.

2. Art Background

A common and natural means of communicating with a computer is with graphic representations of data displayed on a display. Humans interact readily in terms of images, and a person is able to absorb or manipulate information presented in a visual context much faster than if it is represented simply by text. Over the past three decades, a variety of computer graphic systems have been developed to display objects, text and other alpha numeric information on cathode ray tube (CRT) or liquid crystal (LCD) display screens.

Many computer graphic systems employed today utilize an image storage system, such as a bit map frame buffer, and an image display system, such as a CRT. A central processing unit (CPU), or other graphics engine, provides pixel data to the bit map frame buffer. The pixel data comprises a series of values to be written into various known addresses of the frame buffer, where a collection of these values describes an image to be displayed on the CRT or LCD. Typically, pixel values stored in the frame buffer are sequentially read and converted through a digital to analog (D/A) converter, which is coupled to the analog CRT. For digital displays such as LCD, no D/A is required. Some computer display systems employ "double buffering" wherein two frame buffer display memories are alternately read between one another, such that while the computer display system writes data corresponding to an image in the currently non-displayed frame buffer memory, the image data in the other frame buffer memory is displayed. Once the rendering of the image in the non-displayed buffer memory is complete, the display system selects the previously non-displayed buffer and displays its image while the other frame buffer memory image data is updated. For additional description of computer graphics architectures and pixel data streams, see for example; Akeley, Jermoluk, "High Performance Polygon Rendering", Computer Graphics, Vol. 22, No. 4 (August 1988); Shires, "A New VLSI Graphics Coprocessor—The Intel 82786", IEEE Computer Graphics and Applications, Vol. 6, No. 10 (October 1986).

In modern computer display systems which employ, for example, multiple processors, a variety of standard pixel types may be supplied by the CPU or graphics engine to a graphics controller coupled to a frame buffer. However, unless the configuration of particular frame buffer matches the pixel type of graphic data supplied, the graphics controller must convert every pixel to the "type" of pixel data which may be accepted by the frame buffer memory. As will be described, the present invention provides methods and apparatus for address space aliasing to identify pixel types for each point of the pixel data to be written into the frame buffer. The graphics controller, reading a tag identifying the pixel type of the pixel data, converts the pixel data to the particular pixel type of data acceptable by the frame buffer, such that all pixel data written into the frame buffer is of the same type. Some common types of pixel data include RGB 16, RGB 32, YUV 16, and COLORINDEX 8bpp, among others.

SUMMARY OF THE INVENTION

An apparatus and method is disclosed which has application for use in computer controlled display systems, and, in particular, display systems which provide a frame buffer with pixel data of varying types. A CPU or other graphics processor provides a pixel data stream to a graphics controller over a system bus. The pixel data stream includes addresses as well as pixel type tags, which in the presently preferred embodiment comprise 4 bits per pixel. In addition to the address and pixel type tag, pixel data are provided. The pixel type tag identifies the "type" of pixel data in the data stream supplied to the graphics controller. If the data identified by the pixel type tag corresponds to the type of data which the frame buffer is configured for, then the data provided over the system bus is simply passed through the graphics controller and written at the appropriate address in the frame buffer. If, however, the pixel type tag indicates that the data is not of the same type as that for which the frame buffer is configured, then the graphic controller executes a conversion algorithm to convert the pixel data to a single pixel type acceptable to the frame buffer, and the data is then written into the frame buffer at the pixel address. Pixel type tagging is accomplished, in the preferred embodiment, in bits 27:24 of the physical address used to write pixels into the frame buffer. The CPU, or other graphics engine source, affixes the tag to the pixel data, thereby identifying its format. In the present embodiment, tagging applies only to pixel write commands and not to commands from the frame buffer. Accordingly, the use of a pixel type tag field in the pixel data permits a graphics system to utilize a variety of standard pixel types by a CPU, graphics controller or other graphics source, while permitting the frame buffer to utilize a single pixel type to be stored in the frame buffer for subsequent display.

BRIEF DESCRIPTION OF THE DRAWINGS

FIG. 3 illustrates the presently preferred embodiment's 4-bit pixel type tag and representative pixel types corresponding to the tag.

FIG. 4 illustrates the presently preferred embodiment's physical addresses corresponding to the pixel type tag.

DETAILED DESCRIPTION OF THE INVENTION

In the following description, numerous specific details are set forth, such as functional blocks, representing data processing devices, data packets with representative fields, pixel types and physical address locations, etc., to provide a thorough understanding of the present invention. However, it will be apparent to one skilled in the art that the present invention may be practiced without these specific details. In other instances, well known circuits and structures are not described in detail in order not to obscure the present invention unnecessarily.

Figure 1:
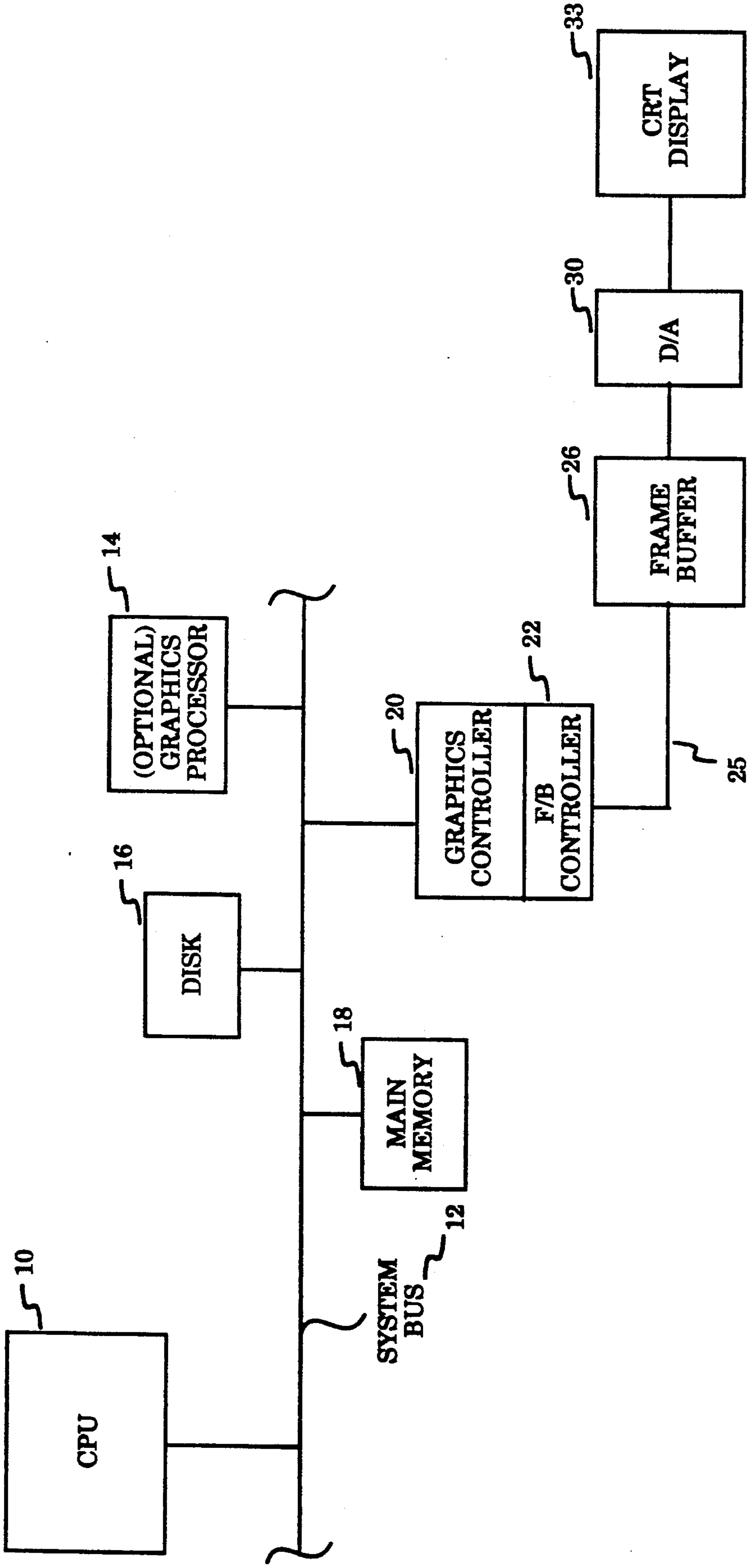
FIG. 1 is a functional block diagram showing a data processing system incorporating the teachings of the present invention.

Referring now to FIG. 1, a computer graphics system employing the teachings of the present invention is illustrated in block diagram form. As shown, a Central Processing Unit (CPU) 10 is coupled to a system bus 12. In addition, the system of FIG. 1 includes a graphics processor 14 and a hard disk 16, as well as a main memory 18 coupled to the system bus 12. As will be described more fully below, the CPU 10 and the graphics processor 14 provide pixel data to a graphics controller 20, also coupled to the system bus 12. Coupled to, or alternatively as part of, the graphics controller 20, is a frame buffer controller 22 which is coupled to both the graphics controller 20 and a frame buffer 26 over a bus 25. In addition, as illustrated in FIG. 1, a digital to analog (D/A) converter 30 is coupled to the frame buffer output and to a cathode ray tube (CRT) display 33.

It will be noted by one skilled in the art, that the embodiment illustrated in FIG. 1 is only one possible example of a graphics system which may utilize the teachings of the present invention. In the example of FIG. 1, the CPU 10 and the graphics processor 14 independently provide graphics data for ultimate display on the CRT display 33. The pixel data is transmitted by, for example, CPU 10 over the system bus 12 to a graphics controller 20. In prior art systems, software executed by the graphics data source, for example, CPU 10, is used to convert the pixel type from a source type, to a pixel type acceptable to the frame buffer 26. In the prior art, this conversion was completed prior to transmission over the system bus 12 to the graphics controller 20 and frame buffer 26. The requirement that the source device, such as CPU 10, convert a pixel type to the type utilized by the frame buffer 26 prior to transmission of the pixel data on the system bus 12, comprises a time-consuming process for every pixel to be written into the frame buffer. The conversion may also result in a data bandwidth explosion onto the bus 12, if the frame buffer pixel type requires more bits than the pre-conversion pixel type. In systems such as that illustrated in FIG. 1 where multiple graphic data sources, such as CPU 10 and graphics processor 14 are used, it is important that various pixel types are able to be used with the same hardware, such as frame buffer 26 to display data on the CRT display 33.

Figure 2:
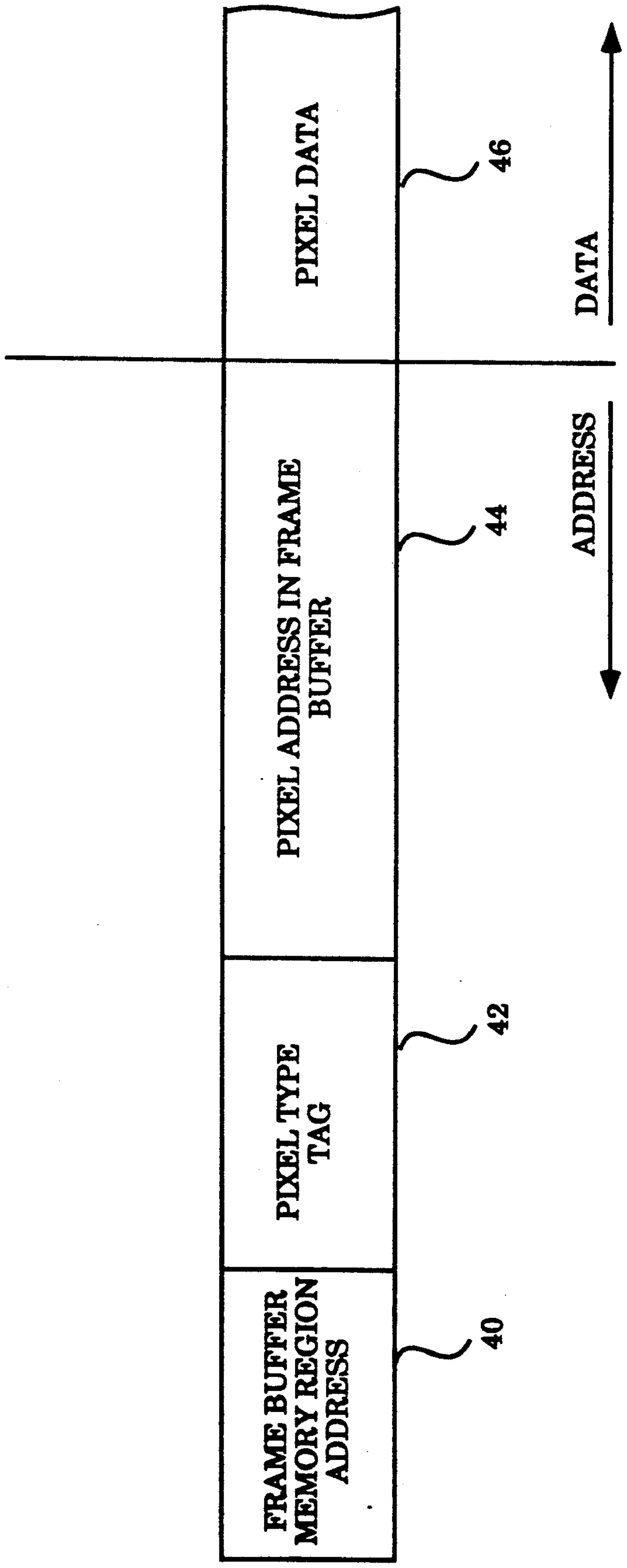
FIG. 2 conceptually illustrates a pixel data stream including the present invention's pixel type tag.

In the presently preferred embodiment, pixel data is transmitted by a source, such as for example CPU 10 or graphics processor 14, over the system bus 12 in a pixel data stream illustrated in FIG. 2. As shown, the pixel stream includes a frame buffer address 40, which identifies the address on the system bus 12 of the graphics controller 20 which is coupled to the frame buffer 26. Thus, pixel data transmitted over the system bus 12, is routed to the graphics controller 20 based on the frame buffer address 40. As will be described more fully below, a pixel type tag 42 forms part of the pixel stream. The pixel type tag 42, in the presently preferred embodiment, comprises a 4-bit tag which identifies one of, a variety of standard pixel types. Examples of standard pixel types common in the industry are illustrated in FIG. 3. Referring once again to FIG. 2, following the pixel type tag 42, a pixel address is provided which identifies the pixel address in the frame buffer 26 to which the pixel data is to be written. Following the pixel address, the pixel data 46 is provided which will be written into the frame buffer 26, and ultimately passed through the D/A converter 30 and displayed on the CRT display 33.

As shown in FIG. 3, the numerical value of the 4-bit pixel type tage 42 identifies one of a variety of standard pixel types known in the art. Presently, pixel type tag values 0101 to 1101 are reserved for future expansion of additional pixel types in the industry. In the presently preferred embodiment, pixel type tag 0000 corresponds to pixel type Ci8 which is the color index 8bpp type. Similarly, pixel type tag 0001 corresponds to pixel type YUV 8, and pixel type 0010 corresponds to type RGB 16. Pixel type 0100 corresponds to RGB 32, and pixel type 0011 corresponds to YUV 16. Pixel types 1110 and 1111 are allocated to non-pixel data which may accompany a pixel stream—in this case, alpha values, which indicate transparency of the pixels, useful for blending or overlaying images. In the presently preferred embodiment, pixel type tag 42 comprises bits 27:24 of the physical address used to write pixels. However, other bits of the 32-bit address could be used instead of 27:24. The address location for the various pixel types utilized in the presently preferred embodiment is illustrated in FIG. 4 (256 megabyte of address space). In the aliasing scheme of the present invention, a 16 megabyte (0FFFFFFh bytes) frame buffer will exist at all of the locations represented in FIG. 4. Alternatively, the pixel type tag 42 may reside in a pixel header, or other data field, thereby requiring no address space aliasing.

Referring once again to FIGS. 1, 2 and 3, in operation, a pixel data source, such as CPU 10, provides pixel data in the form illustrated in FIG. 2, over system bus 12 to the graphics controller 20. The graphics controller 20 decodes the pixel type tag 42 to identify the pixel type of the associated pixel data 46 in the pixel data stream. In the event the pixel data 46 is of the type which the frame buffer 26 is configured for (for example RGB 16), then the graphics controller 20 writes the pixel data 46 at the pixel address 44 within the frame buffer 26. However, if the pixel type tag 42 indentifies the pixel data 46 as being of a different pixel type than that to which the frame buffer 26 is configured, the frame buffer controller 22 converts the pixel data 46 into a pixel type that the frame buffer 26 is configured for. For example, if the pixel data provided by CPU 10 is of a pixel type RGB 32, and the frame buffer 26 is configured for pixel data having the type RGB 16, then the frame buffer controller 22 will convert the RGB 32 pixel data into RGB 16 data. It may convert by dropping 3 of 8 bits for each color R, G and B. The controller 22 will then write the pixel data (in RGB 16 format) into the frame buffer 26. Accordingly, pixel data written into the frame buffer 26 is of the same type such that it can be read out of the frame buffer, and passed through the D/A converter 30 to be displayed on the CRT display 33.

It will be appreciated that the present invention provides a method and apparatus to identify the type of the pixel data using the pixel type tag 42 as part of the pixel data address. This pixel type permits the graphic controller 20 to identify the pixel type of the pixel data 46, and, if necessary, execute a conversion algorithm in the frame buffer controller 22 to convert the pixel data 46 into a pixel type for which the frame buffer 26 is configured. Thus, the present invention improves system performance by identifying the pixel type of the pixel data using the pixel type tage 42, and accomplishing any necessary conversion using the graphic controller 20 and frame buffer controller 22, rather than having the source of the pixel data execute a software conversion routine prior to transmitting the pixel data on the system bus 12. It will be appreciated by one skilled in the art, that the necessary conversion of the pixel data to a pixel type compatible with a frame buffer 26 may be accomplished by the frame buffer controller 22 using either a hardware device, or alternatively, a software routine. By converting all pixels to a single type for placing them into the frame buffer, complexity of the frame buffer and rasterization hardware is greatly reduced. This is in contrast to some prior art systems which stored a pixel type tag with each pixel in the frame buffer, requiring extra storage space and intricate fast hardware to convert pixels to the type used by the DAC or display, during the serialization (rasterization) display process.

Accordingly, the present invention provides apparatus and methods for address space aliasing to identify pixel types which permits a variety of pixel type data to be utilized in a computer controlled display system. While the present invention has been described in conjunction with a number specific embodiments identified in FIGS. 1 through 4, it will be apparent to those skilled in the art, that many alternatives, modifications and variations in light of the foregoing description are possible. The invention is intended to embrace such alternatives, modifications and variations as may fall within the spirit and scope of the invention as disclosed.

I claim:

1. A computer display system including at least one processor coupled to a graphics controller, said graphics controller coupled to a frame buffer comprising a memory with a plurality of addresses, said frame buffer being configured to receive pixel data having a predetermined pixel type, said frame buffer being further coupled to a display, a method for providing pixel data from said processor to said frame buffer for display on said display, comprising the steps of:

said processor providing a pixel data stream to said graphics controller, said pixel data stream including pixel data and a pixel type tag, said pixel type tag for identifying one of a plurality of pixel types said pixel data provided by said processor;

said graphics controller receiving said pixel data and said pixel type tag, and determining based on said pixel type tag whether said pixel data provided by said processor matches said predetermined pixel type of pixel data for which said frame buffer is configured such that if said types do not match, frame buffer controller means coupled to said graphics controller converts said pixel data stream received by said graphics controller into pixel data of said predetermined pixel type for which said frame buffer is configured;

said frame buffer means then writing said pixel data into said frame buffer for display on said display.

2. The method as defined by claim 1 wherein said processor further provides a pixel address with said pixel data and said pixel type tag in said pixel data stream, said pixel address identifying one of said plurality of addresses in said memory of said frame buffer said pixel data is to be written into.

3. The method as defined by claim 2 wherein said pixel type tag comprises a 4 bit tag.

4. The method as defined by claim 3 wherein said pixel type tag comprises bits 27:24 of said pixel address.

5. A computer display system including at least one processor coupled over a system bus to a graphics controller, said graphics controller coupled to a frame buffer comprising a memory with a plurality of addresses, said frame buffer being configured to receive pixel data having a predetermined pixel type, said frame buffer being further coupled to a digital to analog (D/A) converter which is coupled to a display, a method for providing pixel data from said processor to said frame buffer for display on said display, comprising the steps of:

said processor providing a pixel data stream to said graphics controller, said pixel data stream including a graphics controller address identifying a location of said graphics controller on said system bus, a pixel type tag for identifying one of a plurality of pixel types said pixel data provided by said processor comprises, a pixel data and a pixel address identifying an address location in said frame buffer that said pixel data is to be written into;

said graphics controller receiving said pixel data and said pixel type tag, and determining based on said pixel type tag whether said pixel data provided by said processor matches said predetermined pixel type of pixel data for which said frame buffer is configured, such that if said types do not match, frame buffer controller means coupled to said graphics controller converts said pixel data stream received by said graphics controller into pixel data of said predetermined pixel type for which said frame buffer is configured;

said frame buffer controller means then writing said pixel data into said frame buffer at said pixel data address;

said pixel data in said frame buffer being coupled to said D/A converter, and displayed on said display.

6. The method as defined by claim 5 wherein said pixel type tag comprises a 4 bit tag.

7. The method as defined by claim 6 wherein said pixel type tag comprises bits 27:24 of said pixel address.

8. The method as defined by claim 6 wherein said 4 bit pixel type tag comprises the bits 0000, and corresponds to a pixel type COLORINDEX 8 bpp.

9. The method as defined by claim 6 wherein said 4 bit pixel type tag comprises the bits 0001, and corresponds to a pixel type YUV 8 bpp 2:1:1.

10. The method as defined by claim 6 wherein said 4 bit pixel type tag comprises the bits 0010, and corresponds to a pixel type RGB 16 bpp (5,6,5).

11. The method as defined by claim 6 wherein said 4 bit pixel type tag comprises the bits 0110, and corresponds to a pixel type YUV 16 bpp 4:2:2.

12. The method as defined by claim 6 wherein said 4 bit pixel type tag comprises the bits 0100, and corresponds to a pixel type RGB 32 a (8,8,8,8).

13. The method as defined by claim 6 wherein said 4 bit pixel type tag comprises the bits 1110, and corresponds to a pixel type STANDALONE a 1 bpp.

14. The method as defined by claim 6 wherein said 4 bit pixel type tag comprises the bits 1111, and corresponds to a pixel type STANDALONE a 8 bpp.

15. A computer display system comprising:

a frame buffer for storing a plurality of pixel data at defined addresses in said frame buffer, said frame buffer configured to store pixel data of a predefined pixel type;

at least one processor for providing a pixel data stream, said pixel data stream including pixel data and a pixel type tag said pixel type tag identifying one of a plurality of pixel types said pixel data comprises, said pixel data stream further including a pixel address for storing said pixel data in said frame buffer;

a graphics controller coupled to said processor, said graphics controller receiving said pixel data and said pixel type tag, and determining based on said pixel type tag whether said pixel data provided by said processor matches the predefined pixel type for which said frame buffer is configured, such that if said types do not match, a frame buffer controller means coupled to said graphics controller converts said pixel data stream received by said graphics controller into pixel data of said predetermined pixel type for which said frame buffer is configured;

said graphics controller writing said pixel data into said frame buffer at said pixel address;

display means coupled to said frame buffer for reading said pixel data stored in said frame buffer and displaying said data on a display.

16. The display system as defined by claim 15 wherein said display means comprises a digital to analog (D/A) converter and a cathode ray tube (CRT) display.

17. The display system as defined by claim 15 wherein said pixel type tag comprises a 4 bit tag.

18. The display system as defined by claim 17 wherein said pixel type tag comprises bits 27:24 of said pixel address.

19. The display system as defined by claim 17 wherein said 4 bit pixel type tag comprises the bits 0000, and corresponds to a pixel type COLORINDEX 8 bpp.

20. The display system as defined by claim 17 wherein said 4 bit pixel type tag comprises the bits 0001, and corresponds to a pixel type YUV 8 bpp 2:1:1.

21. The display system as defined by claim 17 wherein said 4 bit pixel type tag comprises the bits 0010, and corresponds to a pixel type RGB 16 bpp (5,6,5).

22. The display system as defined by claim 17 wherein said 4 bit pixel type tag comprises the bits 0110, and corresponds to a pixel type YUV 16 bpp 4:2:2.

23. The display system as defined by claim 17 wherein said 4 bit pixel type tag comprises the bits 0100, and corresponds to a pixel type RGB 32 a (8,8,8,8).

24. The display system as defined by claim 17 wherein said 4 bit pixel type tag comprises the bits 1110, and corresponds to a pixel type STANDALONE a 1 bpp.

25. The display system as defined by claim 17 wherein said 4 bit pixel type tag comprises the bits 1111, and corresponds to a pixel type STANDALONE a 8 bpp.

* * * * *